No. 886,164. PATENTED APR. 28, 1908.
H. TAIT.
RAKE TOOTH CLEANER.
APPLICATION FILED JUNE 13, 1907.
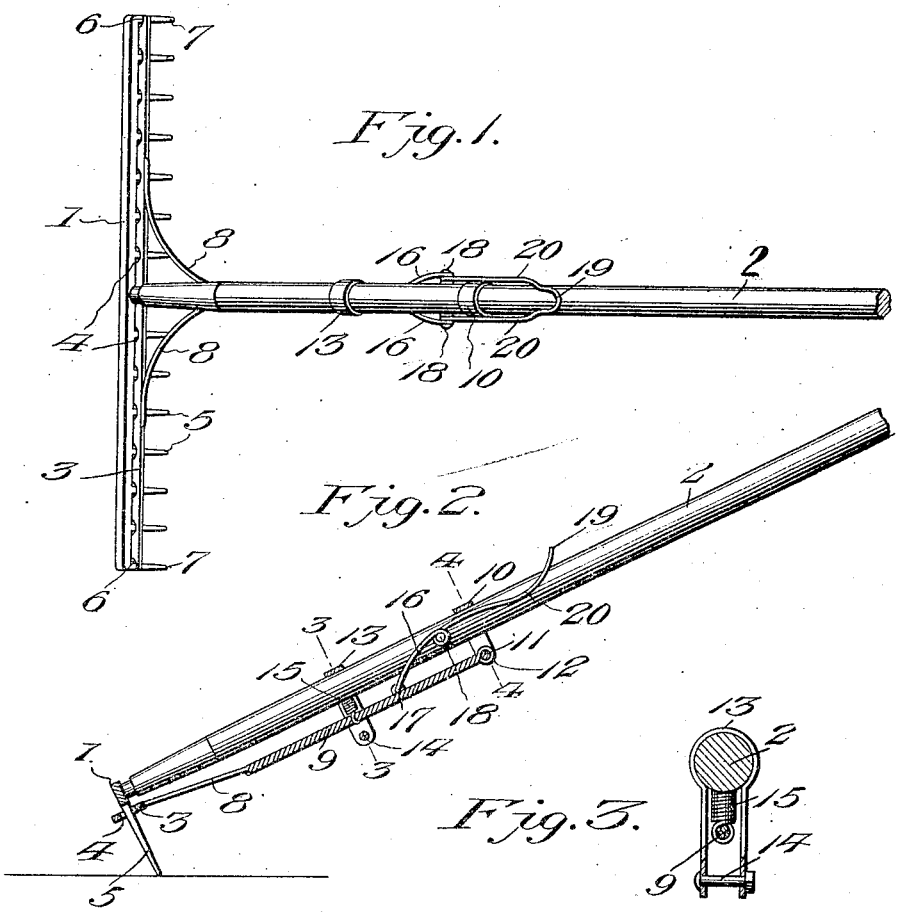
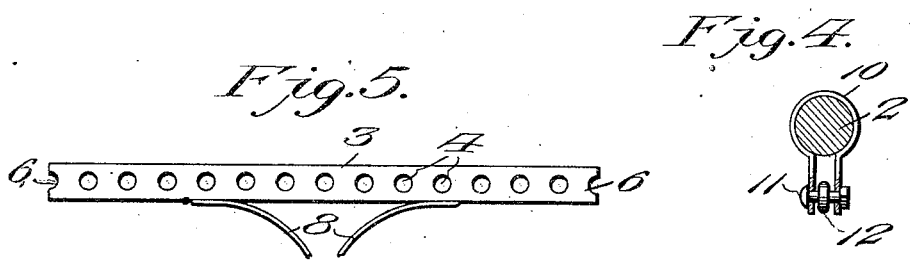
Witnesses
Edwin F. McKee
Inventor
Herbert Tait
By Victor J. Evans
Attorney

UNITED STATES PATENT OFFICE.

HERBERT TAIT, OF BUFFALO, NEW YORK.

RAKE-TOOTH CLEANER.

No. 886,164.　　　　　Specification of Letters Patent.　　　Patented April 28, 1908.

Application filed June 13, 1907. Serial No. 378,865.

To all whom it may concern:

Be it known that I, HERBERT TAIT, a citizen of the United States of America, residing at Buffalo, in the county of Erie and State of New York, have invented new and useful Improvements in Rake-Tooth Cleaners, of which the following is a specification.

This invention relates to rake tooth cleaners, the object of the same being to provide a device of simple construction which can be easily applied to a rake, and which will quickly clean the teeth of the same when the operating lever is actuated.

Another object of the invention is to provide a rake tooth cleaner which is actuated by a lever connected to the rake handle, and in which a spring moves the cleaning device in one direction.

These and other objects may be attained by means of the construction illustrated in the accompanying drawing, in which:

Figure 1 is a perspective view of a rake tooth cleaner made in accordance with my invention. Fig. 2 is a longitudinal sectional view of the same. Fig. 3 is a transverse sectional view on the line 3—3 of Fig. 2. Fig. 4 is a similar view on the line 4—4 of Fig. 2. Fig. 5 is a detail plan view of the cleaner plate.

Referring to the drawings for a more particular description of my invention, the numeral 1 designates the rake head which may be of any suitable construction and 2 is the handle therefor.

The rake tooth cleaner comprises a cleaner plate 3 provided with a series of perforations 4 spaced apart a suitable distance to conform to the distance apart of the rake teeth 5. At the opposite ends of the cleaner plate 3 a notch 6 is provided for the end teeth 7 of the rake. Curved braces 8 are connected to the cleaner plate and formed on or connected to said braces is a supporting bar 9 which is pivoted at its upper end to a clip 10 which surrounds the handle 2 and is provided with a bolt 11 which passes through the clip and forms a pivot pin for the plate 9, said plate having a pivot bearing 12 through which the bolt 11 passes. A clip 13 is secured to the handle 2 at a point between the clip 10 and the cleaner plate 3, and a bolt 14 which secures the clip to the handle 2 serves as a stop for the bar 9 to prevent the cleaner plate 3 from withdrawal from the teeth 5 of the rake. A spring 15 is secured at one end to the bar 9, and at its opposite end to the handle 2, said spring serving to move the cleaner plate 3 to the position shown in Figs. 1 and 2. A lever 16 comprising a wire bail pivotally connected at 17 to the plate is also pivoted to pins 18 which extend outward from the handle 2, said lever being bent around the pins 18 to pivot the same thereto and being provided with a handle portion 19 which curves upwardly from the handle, the side members 20 of the lever being disposed at opposite sides of the handle.

The operation of my invention may be briefly described as follows: When it is desired to clean the rake teeth 5 of dirt, leaves or other obstructions, the handle portion of the lever 16 is raised to throw the bar 9 down against the tension of the spring 15, thus carrying the cleaner plate 3 down and thoroughly cleaning the teeth 5. When the handle portion 19 of the lever is released, the spring 15 draws the bar 9 up toward the handle in the position in Fig. 2.

My invention is of simple construction, can be quickly applied to a rake, and operates efficiently for the purpose designed.

Having thus described the invention, what I claim is:

The herein described rake tooth cleaner comprising a perforated cleaner plate to engage the teeth of the rake, braces connected to the cleaner plate, a bar formed on said braces, said bar being pivotally connected to the handle of the rake by means of a clip, a spring connected to said bar and to said handle, a clip provided with a stop bolt for limiting the movement of the cleaner plate, and a lever consisting of a bent wire pivotally connected to the opposite sides of the handle and pivoted to said bar.

In testimony whereof, I affix my signature in presence of two witnesses.

HERBERT TAIT.

Witnesses:
　CATHARINE HATCH,
　GEORGE L. HATCH.